United States Patent [19]

Fukuda

[11] Patent Number: 5,239,689
[45] Date of Patent: Aug. 24, 1993

[54] TRANSMITTER/RECEIVER APPARATUS WITH COMMON OSCILLATOR THAT CHANGES FREQUENCY BETWEEN TRANSMITTING AND RECEIVED OPERATIONS

[75] Inventor: Kunio Fukuda, Tokyo, Japan

[73] Assignee: Sony Corporation, Tokyo, Japan

[21] Appl. No.: 779,269

[22] Filed: Oct. 18, 1991

[30] Foreign Application Priority Data

Oct. 25, 1990 [JP] Japan ................... 2-288071

[51] Int. Cl.$^5$ .............................................. H04B 1/54
[52] U.S. Cl. ........................................ 455/86; 455/73
[58] Field of Search ........................... 455/75–76, 455/78–79, 82–83, 85–87, 73; 370/29, 27, 95.1

[56] References Cited

U.S. PATENT DOCUMENTS

| | | | |
|---|---|---|---|
| 4,037,158 | 7/1977 | Eastmond | 370/29 |
| 4,238,850 | 12/1980 | Vance | 370/27 |
| 4,525,835 | 6/1985 | Vance et al. | 455/86 |
| 4,903,257 | 2/1990 | Takeda et al. | 455/86 |
| 5,117,423 | 5/1992 | Sheperd et al. | 370/95.1 |
| 5,123,008 | 6/1992 | Beesley | 455/86 |

*Primary Examiner*—Reinhard J. Eisenzopf
*Assistant Examiner*—Nguyen Vo
*Attorney, Agent, or Firm*—Lewis H. Eslinger; Jay H. Maioli

[57] ABSTRACT

A transmitter/receiver apparatus wherein a sufficiently great difference is assured between frequencies of intermediate frequency signals of transmitting and receiving circuits to assure an improved disturbance preventing performance. An oscillating circuit for oscillating a signal for selection of a channel is provided commonly for the transmitting and receiving circuits. In the transmitting circuit, power is supplied, also in a receiving operation, to a modulating circuit so that it continues a modulating operation, and an output of the modulating circuit is frequency converted with an oscillation output of the oscillating circuit into a signal of a frequency corresponding to a predetermined channel. In the receiving circuit, a received signal of the predetermined channel is frequency converted with the oscillation output of the oscillating circuit into a signal of an intermediate frequency. The frequency of the oscillation output of the oscillating circuit is varied by a predetermined amount between transmission and reception.

3 Claims, 5 Drawing Sheets

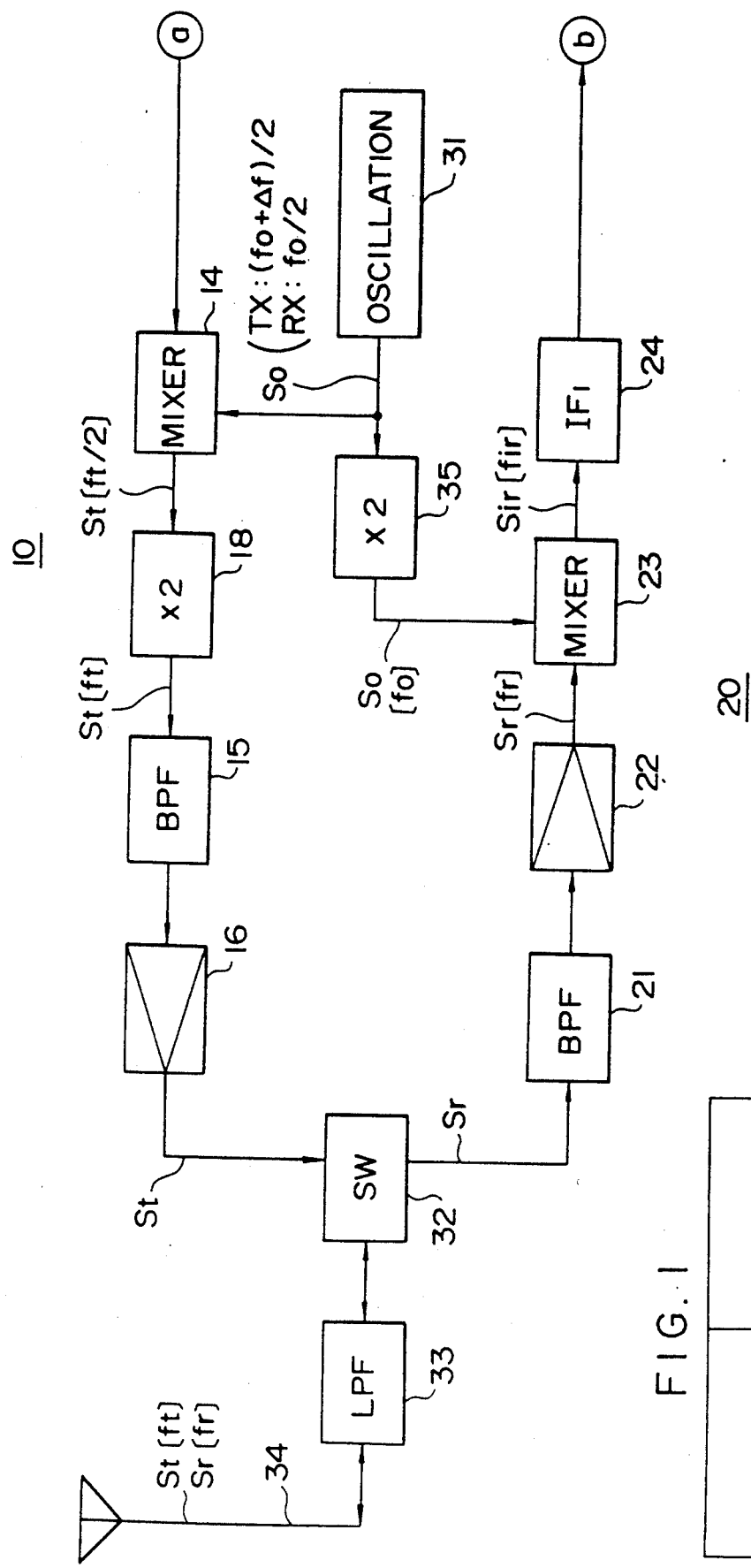

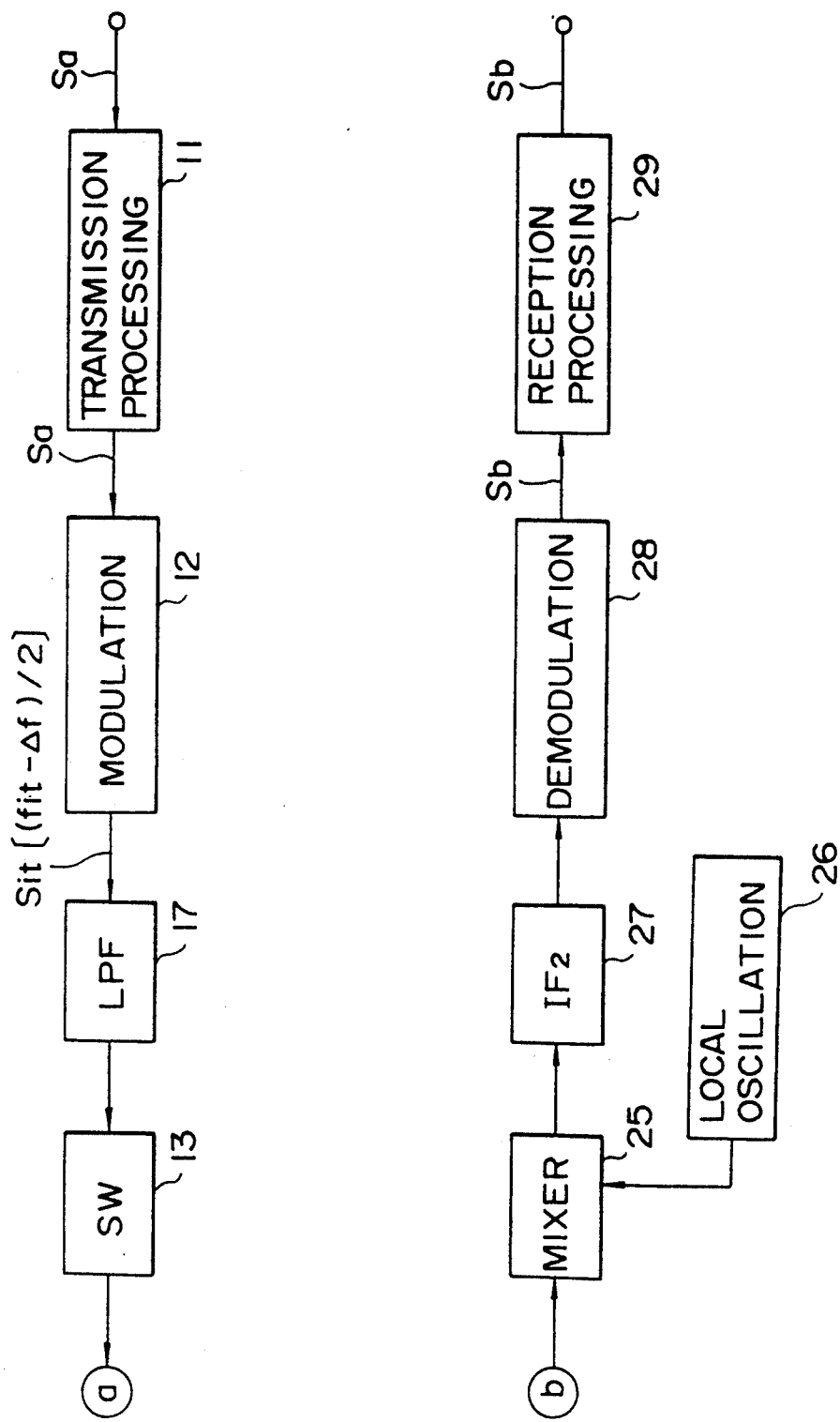
F I G. 1(B)

| FIG.3(A) | FIG.3(B) |

TRANSMITTER/RECEIVER APPARATUS WITH COMMON OSCILLATOR THAT CHANGES FREQUENCY BETWEEN TRANSMITTING AND RECEIVED OPERATIONS

BACKGROUND OF THE INVENTION

1. Field of the Invention

This invention relates to a transmitter/receiver apparatus for use for the TDMA/TDD (time division multiple access/time division duplex) system.

2. Description of the Prior Art

In a transmitter/receiver apparatus of the TDMA/TDD system which is employed in a tele-point system and so forth, a transmission frequency is equal to a reception frequency, and one frame is constituted, for example, as shown in FIG. 2, from transmission slots T1 to T4 and reception slots R1 to R4. The slots T1 and R1, T2 and R2, T3 and R3, and T4 and R4 are each used in pair.

Since such transmission and reception are performed, a transmitting circuit and a receiving circuit of a transmitter/receiving circuit of the TDMA/TDD system are constructed, for example, in such a manner as shown in FIG. 3.

Referring to FIG. 3, a transmitter/receiver apparatus includes a transmitting circuit 10 and a receiving circuit 20. In the transmitting circuit 10, an aural signal Sa is supplied to a transmission processing circuit 11, at which processing of the aural signal Sa for transmission of the TDMA/TDD system is performed. The thus processed aural signal Sa is extracted, for example, for each transmission slot T1.

Such signal Sa is supplied to an FM (frequency modulation) modulating circuit 12 constituted from a PLL (phase-locked loop), at which it is converted into an FM intermediate frequency signal Sit of a predetermined intermediate frequency fit, for example, of fit=300 MHz. The FM intermediate frequency signal Sit thus produced is supplied to a switching circuit 13, which is turned on for the period of each transmission slot T1 so that the signal Sit is outputted from the switching circuit 13 for the period of each transmission slot T1.

The signal Sit thus outputted is supplied to a mixer circuit 14 while an oscillation signal So having a frequency fo is outputted from an oscillating circuit 31 for selection of a transmission/reception channel and supplied to the mixer circuit 14 so that the signal Sit is frequency converted into an FM signal St of another frequency ft. It is to be noted that, in such frequency conversion.

$$ft = fit + fo$$

and for example, ft=2.6 GHz.

The FM signal St is supplied to an antenna 34 along a signal line including a band-pass filter 15, a power amplifier 16, a high frequency switching circuit 32 and a low-pass filter 33 so that it may be transmitted from the antenna 34.

On the other hand, in the receiving circuit 20, an FM signal Sr transmitted thereto for the period of a reception slot R1 is received by an antenna 34. It is to be noted that the frequency fr of the received FM signal Sr is equal to the frequency ft of the transmission frequency St.

Then, the received signal Sr is supplied to a first mixer circuit 23 by way of a signal line including the filter 33, the switching circuit 32, a band-pass filter 21 and a high frequency amplifier 22. The oscillation signal So from the oscillating circuit 31 is supplied also to the mixer circuit 23 so that the signal Sr is frequency converted into a first intermediate frequency signal Sir. It is to be noted that, in this instance, since fr=ft, the signal Sir has an intermediate frequency fir equal to the frequency fit of the signal Sit.

Then, the signal Sir is supplied to a second mixer circuit 25 by way of a first intermediate frequency amplifier 24 while a second local oscillation signal is supplied from a second local oscillating circuit 26 to the mixer circuit 25 so that the signal Sir is frequency converted into a second intermediate frequency signal having an intermediate frequency of, for example, 10.7 MHz. A signal obtained by such frequency conversion is supplied by way of a second intermediate frequency amplifier 27 to an FM demodulating circuit 28, at which the signal is demodulated into an aural signal Sb for each reception slot R1. The aural signal Sb is supplied to a reception processing circuit 29, at which processing for reception of the TDMA/TDD system to extract the original aural signal Sb is performed.

By the way, since the FM modulating circuit 12 is commonly constituted from a PLL, if power is supplied to it only for the period of each transmission slot to put it into an operative condition, then it cannot perform an ordinary FM modulating operation for the period of each transmission slot due to a rising characteristic of such PLL.

Therefore, power is supplied to the FM modulating circuit (PLL) 12 also for the period of each reception slot. If power is supplied in this manner, the signals Sit and St are outputted also for the period of each slot. Accordingly, the switching circuit 13 is turned off and the power supply to the circuits 15 and 16 is interrupted for the period of each reception slot.

However, even if the switching circuit 13 is turned off and the power supply to the circuits 15 and 16 is interrupted for the period of each reception slot in this manner, the FM modulating circuit 12, that is, the PLL itself, continues to oscillate with the oscillation frequency fit which is equal to the first intermediate frequency fir of the receiving circuit 20.

Consequently, the oscillation signal Sit of the modulating circuit 12 will plunge into the circuits 23, 24 and 25 of the receiving circuit 20 to cause a disturbance to reception thereby to deteriorate a substantial reception sensitivity of the receiving circuit 20.

In this instance, if the oscillation frequency fo of the oscillating circuit 31 is varied between transmission and reception, then fir≠fit, and consequently, a direct disturbance can be eliminated.

Meanwhile, in order to allow a change of a channel, also the oscillation circuit 31 is commonly constituted from a PLL. Further, since the interval between transmission and reception is several milliseconds, if the difference of the oscillation frequency fo between transmission and reception is great, then a normal oscillation frequency cannot be obtained due to a responding characteristic of a PLL.

However, if the difference of the oscillation frequency fo between transmission and reception is set to a comparatively small value corresponding to one or two channels, then when the oscillation signal Sit of the modulating circuit 12 plunges into the circuits 23, 24 and 25 of the receiving circuit 20, where the frequency characteristic of the intermediate frequency amplifier 24 corresponds to one or two channels or so, the signal Sit cannot be separated, and consequently, a disturbance to an adjacent channel may be caused or a disturbance of cross modulation may be caused with another signal of another frequency received by the antenna 34.

Further, in case the transmitting/receiving frequency or frequencies belong to a quasi-microwave band as described hereinabove, the frequency fir belongs to a VHF or UHF band in most cases, and accordingly, it is difficult also from the point of view of mounting to prevent a roundabout of the signal Sit from the FM modulating circuit 12.

SUMMARY OF THE INVENTION

It is an object of the present invention to provide a transmitter/receiver apparatus wherein a sufficiently great difference is assured between a frequency of an FM intermediate frequency signal at a transmitting section and another frequency of another intermediate frequency signal at a receiving section to assure an improved disturbance preventing performance.

In order to attain the object, according to an aspect of the present invention, there is provided a transmitter/receiver apparatus of the TDMA/TDD system, which comprises a transmitting circuit for transmitting an FM signal in response to an input signal, a receiving circuit for receiving an FM signal, an oscillating circuit provided commonly for transmitting and receiving operations of the transmitter/receiver apparatus for oscillating a signal for selection of a channel, the transmitting circuit including a modulating circuit to which power is supplied, also in a receiving operation of the transmitter/receiver apparatus, to continue an oscillating or modulating operation thereof, the transmitting circuit further including frequency converting means for frequency converting an output signal of the modulating circuit with an oscillation output of the oscillating circuit into a signal of a frequency corresponding to a predetermined channel, the receiving circuit being of the superheterodyne type wherein a received signal of the predetermined channel is frequency converted with the oscillation output of the oscillating circuit into a signal of an intermediate frequency, and means for varying the frequency of the oscillation output of the oscillating circuit by a predetermined amount between transmission and reception.

With the transmitter/receiver apparatus, although the frequency of the oscillation output of the oscillating circuit does not vary very much between transmission and reception, a sufficiently great difference is assured between the frequency of the output signal of the modulating circuit and the frequency of the received signal after frequency conversion. Consequently, the transmitter/receiver apparatus has an improved disturbance preventing performance.

According to another aspect of the present invention, there is provided a transmitter/receiver apparatus, which comprises an oscillating circuit provided commonly for transmitting and receiving operations of the transmitter/receiver apparatus for oscillating a signal for selection of a channel, a modulating circuit, a first mixer circuit for frequency converting an output signal of the modulating circuit with an oscillation output of the oscillating circuit, a first multiplying circuit for multiplying an output signal of the mixer circuit by n which is a value greater than 1 to produce a transmission signal of a predetermined channel, a second multiplying circuit for multiplying the oscillation signal of the oscillating circuit by n, a second mixer circuit for frequency converting a received signal of the predetermined channel with an output signal of the second multiplying circuit into a signal of an intermediate frequency, an intermediate frequency amplifier to which the intermediate frequency signal from the second mixer circuit is supplied, and a demodulating circuit to which an output signal of the intermediate frequency amplifier or another signal obtained by further frequency conversion of the output signal of the intermediate frequency amplifier is supplied, the modulating circuit being supplied, also in a receiving operation of the transmitter/receiver apparatus, with power to continue an oscillating or modulation operation thereof, the output signal of the modulating circuit having an intermediate frequency fit set, where the intermediate frequency of the intermediate frequency signal is fir, to $$fit = (fir \pm \Delta f)/n$$

where $\Delta f$ is a predetermined frequency, the oscillation frequency of the oscillating circuit being varied by $\Delta f/n$ between transmission and reception.

With the transmitter/receiver apparatus, since the frequencies of the output signal of the modulating circuit and the intermediate frequency signal are set, for example, to $(fit - \Delta f)/2$ and fir ($=fit$), respectively, the two signals are sufficiently different from each other.

Accordingly, in a receiving operation of the transmitter/receiver apparatus, even if the output signal of the modulating circuit plunges into the second mixer circuit, intermediate frequency amplifier and so forth of a receiving section of the transmitter/receiver apparatus, such signal can be attenuated or removed sufficiently. Consequently, a disturbance to reception, a disturbance to an adjacent channel, a disturbance of cross modulation and so forth can be reduced remarkably, and accordingly, there is no deterioration in receiving sensitivity of the transmitter/receiver apparatus by such disturbances.

Further, since the modulating circuit need not stop its oscillation in a receiving operation of the transmitter/receiver apparatus, it can oscillate or FM modulate with a normal frequency in a transmitting operation of the transmitter/receiver apparatus.

Further, while the frequency of the oscillation output of the oscillating circuit is varied between transmission and reception, the difference thereof is sufficiently small to allow the oscillating circuit to sufficiently follow such variation of the oscillation frequency, and accordingly, transmitting and receiving operations of the transmitter/receiver apparatus can be performed with certainty.

Meanwhile, where the transmission and reception frequencies belong to a quasi-microwave band, even if the frequency of the intermediate frequency signal belongs to a VHF to UHF band, the signal of the output signal of the modulating signal is equal to or lower than one half that of the apparatus of FIG. 3. Consequently, a possible roundabout can be restricted easily, and accordingly, restrictions to shielding and mounting are moderated and reduction in overall size and increase in density of elements of the apparatus can be realized.

Further, while high power consumption is required if a signal of a quasi-microwave band is oscillated directly, the frequency of the oscillation output of the oscillating circuit is equal to or less than one half that of the apparatus of FIG. 3. Accordingly, even if the oscillation signal is oscillated directly from the oscillating circuit while the transmission/reception frequency or frequencies belong to a quasi-microwave band, high power consumption is not required.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1, and 1A are block diagrams of a transmitter/receiver apparatus showing a preferred embodiment of the present invention:

DETAILED DESCRIPTION OF THE PREFERRED EMBODIMENT

Figure 2:
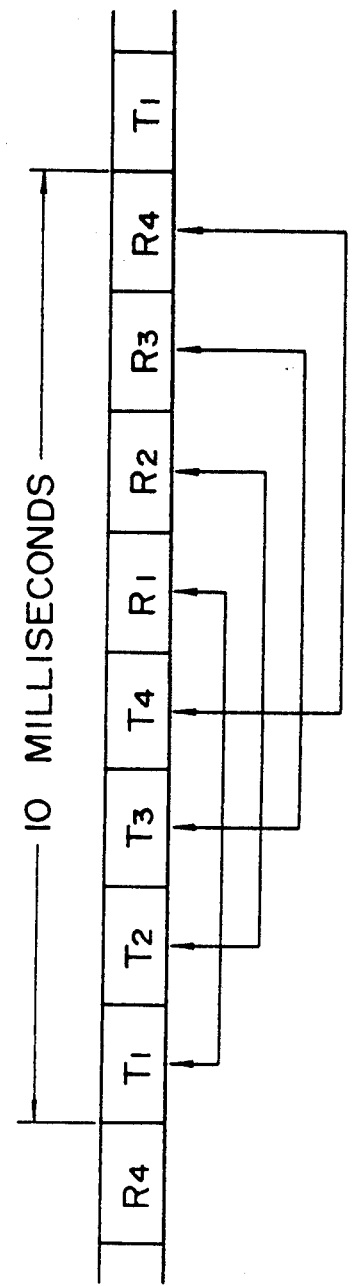
FIG. 2 is a diagrammatic representation illustrating a construction of a frame.

Referring to FIG. 1, there is shown a transmitter/receiver apparatus according to the present invention. The transmitter/receiver apparatus has a somewhat common construction to that of the apparatus described hereinabove with reference to FIG. 3. Thus, in a transmitting operation of the transmitter/receiver apparatus, an aural signal Sa from a transmission processing circuit 11 is supplied to an FM modulating circuit 12, at which it is converted into an FM signal Sit of an intermediate frequency. In this instance, however, the frequency of the signal Sit is set to $$(fit - \Delta f)/2$$

where $\Delta f$ is a distance between channels. Also the degree of modulation of the signal Sit with the signal Sa is set to ½ that of the signal Sit of the apparatus described hereinabove with reference to FIG. 3.

The signal Sit is supplied to a low-pass filter 17, at which unnecessary high frequency components are removed from it. Then, the signal Sit is supplied to a mixer circuit 14 by way of a switching circuit 13.

Meanwhile, the frequency of an oscillation signal So of an oscillating circuit 31 is set, for transmission, to $$(fo + \Delta f)/2$$

and such oscillation signal So is supplied to the mixer circuit 14.

As a result, the signal Sit is frequency converted with the signal So by the mixer circuit 14 into another signal St of another frequency given by $$(fo + \Delta f)/2 + (fit - \Delta f)/2$$
$$= (fo + fit)/2$$
$$= ft/2$$

Then, the signal St is supplied to a multiplying circuit 18, at which it is multiplied by two into an FM signal St of the frequency ft. The FM signal St is supplied to a band-pass filter 15 and is then processed in a similar manner by a power amplifier 16, a high frequency switching circuit 32 and a low-pass filter 33 as in the apparatus shown in FIG. 3 so that it is transmitted from an antenna 34.

On the other hand, in a receiving operation of the transmitter/receiver apparatus, the switching circuit 13 is turned off, and the power supply to the circuits 15 and 16 is interrupted. Meanwhile, power is supplied, even in a receiving operation, to the FM modulating circuit 12 so that oscillation is continued by the FM modulating circuit 12.

Then, in an receiving operation, a received FM signal Sr having a frequency fr equal to the frequency ft is outputted from a high frequency amplifier 22 and supplied to a first mixer circuit 23.

Here, the frequency of the oscillation signal So is set, upon reception, to fo/2 and such oscillation signal So is supplied to a multiplying circuit 35, at which it is multiplied by two into another signal So of the frequency fo. The signal So is supplied to the mixer circuit 23.

As a result, at the mixer circuit 23, the signal Sr is frequency converted with the signal Sr into a first intermediate frequency signal Sir of a frequency given by fr − fo = fir.

Figures 3, 3A:
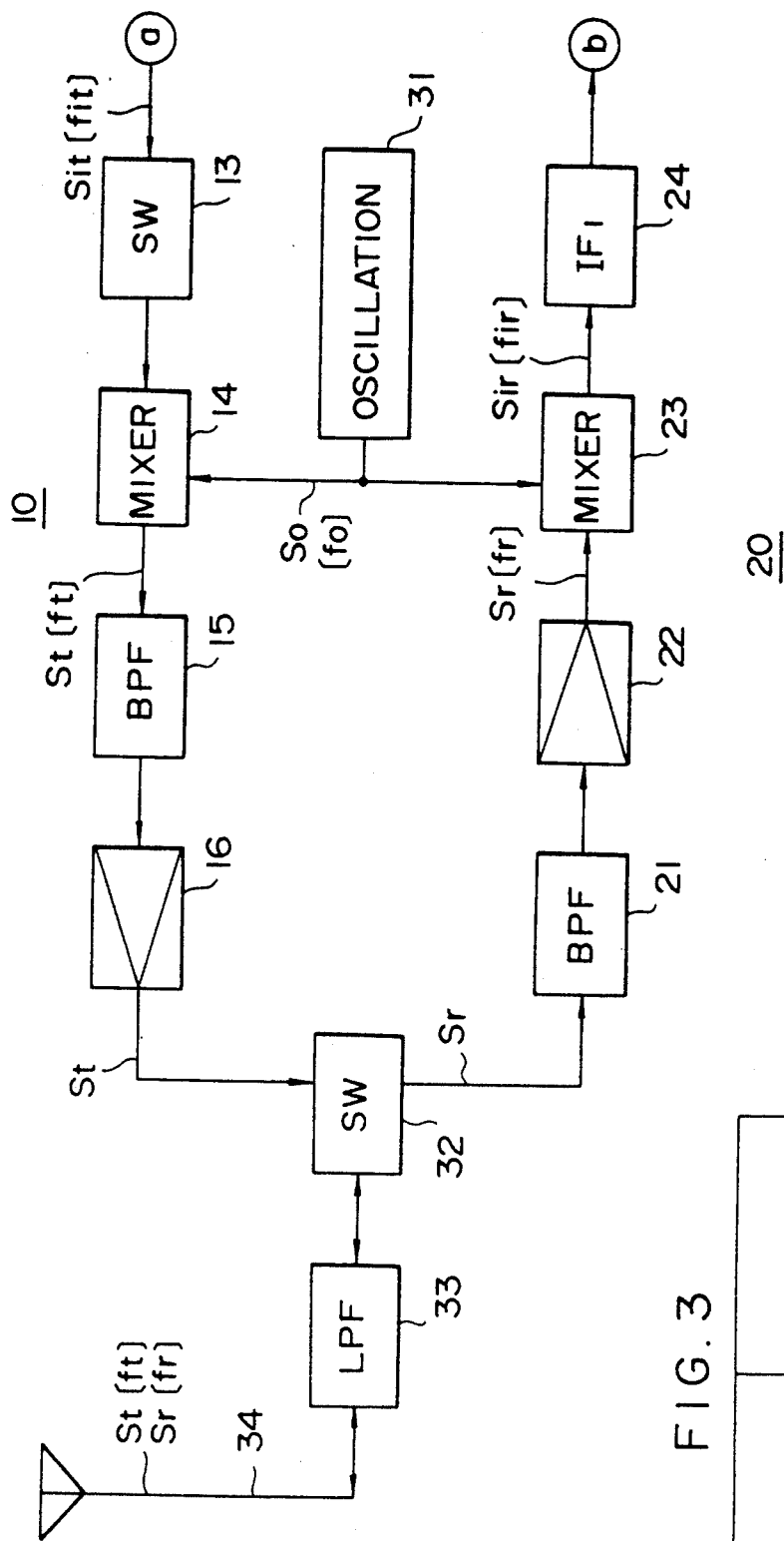
FIGS. 3, 3A and 3B are block diagrams of a conventional transmitter/receiver apparatus.
Figure 3B:
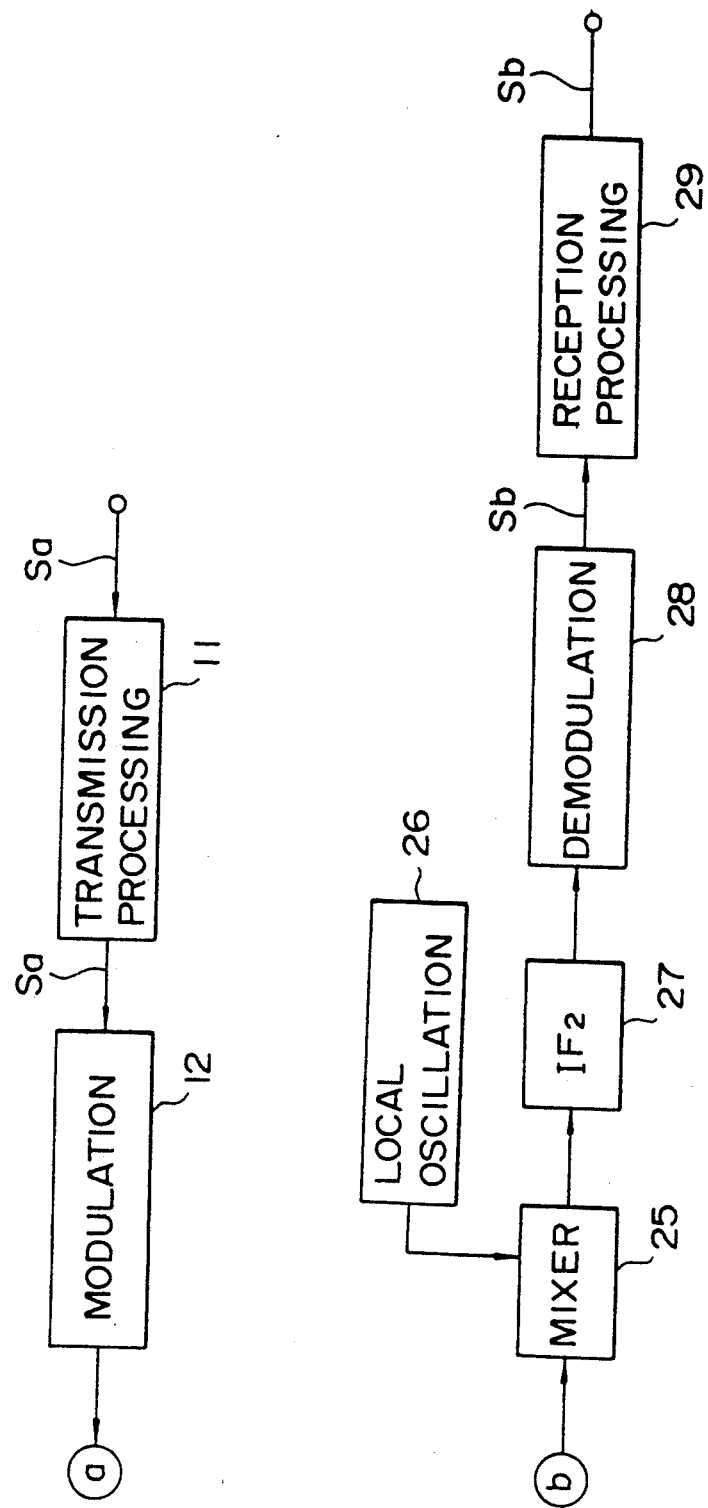

Then, the signal Sir is supplied to a second mixer circuit 25 and is then processed in a similar manner by a second intermediate frequency amplifier 27 and an FM demodulating circuit 28 as in the apparatus of FIG. 3 so that an aural signal Sb is outputted from a reception processing circuit 29.

In this manner, transmission/reception of the TDMA/TDD system is performed with the transmitter/receiver apparatus according to the present invention. In this instance, particularly in accordance with the present invention, since the frequency of signal Sit: $(fit − \Delta f)/2$ and
frequency of signal Sir: fir (=fit)

a frequency difference between the signals Sit and Sir is given by $$|(fit − \Delta f)/2 − fir| = (fit − \Delta f)/2$$

and accordingly, the frequencies of the signals Sit and Sir are sufficiently different from each other.

Accordingly, even if the signal Sit from the modulating circuit 12 plunges, in a receiving operation of the transmitter/receiver apparatus, into the circuits 23, 24 and 25 of the receiving circuit 20, the signal Sit can be attenuated or eliminated sufficiently. Consequently, a disturbance to reception, a disturbance to an adjacent channel, a disturbance of cross modulation and so forth can be reduced remarkably, and accordingly, there is no deterioration in receiving sensitivity of the transmitter/receiver apparatus by such disturbances.

Further, since the modulating circuit 12 need not stop its oscillation upon reception, it can perform oscillation or FM modulation with a correct frequency in a transmitting operation of the transmitter/receiver apparatus.

Further, while the oscillation frequency of the oscillating circuit 31 varies between upon transmission: $(fo + \Delta f)/2$
upon reception: fo/2 the difference between them is given by $$(fo + \Delta f)/2 − fo/2 = \Delta f/2$$

and accordingly, the difference is sufficiently small. Consequently, the oscillating circuit 31 can sufficiently follow such variation in oscillation frequency, and accordingly, transmitting and receiving operations described above can be performed with certainty.

On the other hand, where the transmitting/receiving frequency or frequencies belong to a quasi-microwave band, even if the frequency fir belongs to a VHF to UHF band, the frequency of the signal Sit from the FM modulating circuit 12 is (fit−Δf)/2 and is as low as one half or less of that of the apparatus of FIG. 3. Consequently, such roundabout as described above can be restricted easily, and accordingly, restrictions to shielding and mounting are moderated and reduction in overall size and increase in density of elements of the apparatus can be realized.

Further, if a signal of a quasi-microwave band is oscillated directly, then high power consumption is required. However, in accordance with the present invention, since the oscillation frequency of the oscillating circuit 31 is equal to or less than one half that of the apparatus of FIG. 3, even if the oscillation signal So is oscillated directly while the transmitting/receiving frequency or frequencies belong to a quasi-microwave band, high power consumption is not required.

It is to be noted that, while the multiplying circuits 35 and 18 are each constructed so as to multiply a signal by two, it is also possible to construct each of the multiplying circuits 35 and 18 otherwise such that it multiplies a signal by n which is an arbitrary number greater than 1 and the frequencies of the signals Sit and So are set respectively to signal Sit: (fit±Δf)/n
signal So:
 (fo∓Δf)/n: upon transmission
 fo/n: upon reception.

Further, while the receiving circuit 20 is of the double superheterodyne type in the foregoing description, it may otherwise be of the single superheterodyne type. While also the frequency conversion of the transmitting circuit 10 and the receiving circuit 20 is of the lower heterodyne type in the foregoing description, it may otherwise be of the upper superheterodyne type.

Having now fully described the invention, it will be apparent to one of ordinary skill in the art that many changes and modifications can be made thereto without departing from the spirit and scope of the invention as set forth herein.

What is claimed is:

1. A transmitter/receiver apparatus of the TDMA/TDD system, comprising:
   a transmitting circuit for transmitting an outgoing FM signal in response to an input signal;
   a receiving circuit for receiving an incoming FM signal;
   an oscillating circuit provided commonly for transmitting and receiving operations of said transmitter/receiver apparatus for oscillating a signal for selection of a channel;
   said transmitting circuit including a modulating circuit to which power and said input signal are supplied in a transmitting operation of said transmitter/receiver apparatus, power but no said input signal being supplied to said modulating circuit in a receiving operation of said transmitter/receiver apparatus;
   said transmitting circuit further including frequency converting means for frequency converting an intermediate frequency transmission output signal Sit of said modulating circuit with an oscillation output of said oscillating circuit into a signal of a frequency corresponding to a predetermined channel;
   said receiving circuit being of the superheterodyne type wherein a received signal of the predetermined channel is frequency converted with the oscillation output of said oscillating circuit into a reception signal Sir of an intermediate frequency; and
   means for varying the frequency of the oscillation output of said oscillating circuit by an amount between said transmitting and receiving operations such that a frequency difference between said signals Sit and Sir is equal to half the difference between the frequency of said signal Sit and the frequency spacing between said predetermined channel and an adjacent channel.

2. A transmitter/receiver apparatus, comprising:
   an oscillating circuit provided commonly for transmitting and receiving operations of said transmitter/receiver apparatus for oscillating a signal for selection of a channel;
   a modulating circuit;
   a first mixer circuit for frequency converting an output signal of said modulating circuit with an oscillation output of said oscillating circuit;
   a first multiplying circuit for multiplying an output signal of said first mixer circuit by n which is a value greater than 1 to produce a transmission signal of a predetermined channel;
   a second multiplying circuit for multiplying the oscillation signal of said oscillating circuit by n;
   a second mixer circuit for frequency converting a received signal of the predetermined channel with an output signal of said second multiplying circuit into a signal of a first intermediate frequency;
   an intermediate frequency amplifier to which the first intermediate frequency signal from said second mixer circuit is supplied; and
   a demodulating circuit to which an output signal derived from said intermediate frequency amplifier is supplied;
   said modulating circuit being supplied, also in a receiving operation of said transmitter/receiver apparatus, with power;
   the output signal of said modulating circuit having a second intermediate frequency fit and the frequency of the first intermediate frequency signal being fir, where $$fit = (fir \pm \Delta f)/n$$

and Δf is a predetermined frequency;
   the oscillation frequency of said oscillating circuit being varied by Δf/n between said transmitting and receiving operations.

3. A transmitter/receiver apparatus according to claim 2, wherein the predetermined frequency Δf is equal to a distance between adjacent channels.

* * * * *